March 17, 1959 R. P. SCHERER 2,877,563
APPARATUS FOR DRYING GELATIN CAPSULES
Original Filed April 18, 1955 5 Sheets-Sheet 3

INVENTOR:
Robert P. Scherer,
BY Bair, Freeman
& Molinare
ATTORNEYS.

March 17, 1959 R. P. SCHERER 2,877,563
APPARATUS FOR DRYING GELATIN CAPSULES
Original Filed April 18, 1955 5 Sheets-Sheet 4
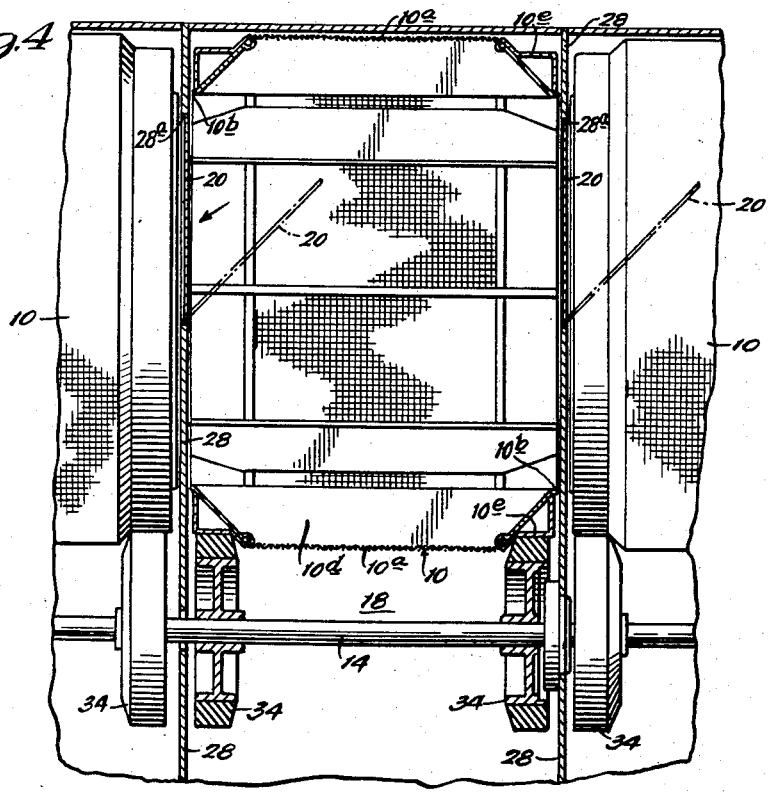
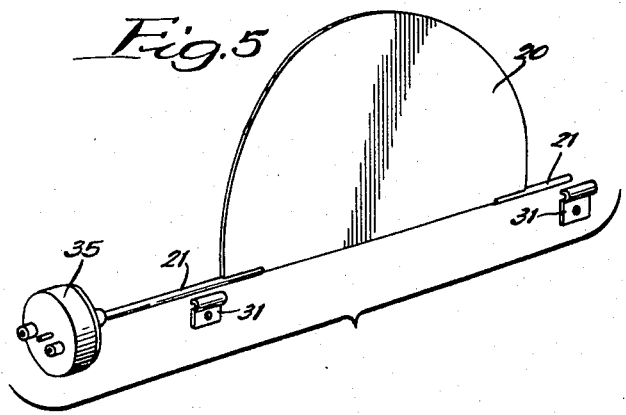
INVENTOR:
Robert P. Scherer.
BY
Bair, Freeman & Molinare
ATTORNEYS.

March 17, 1959 R. P. SCHERER 2,877,563
APPARATUS FOR DRYING GELATIN CAPSULES
Original Filed April 18, 1955 5 Sheets-Sheet 5
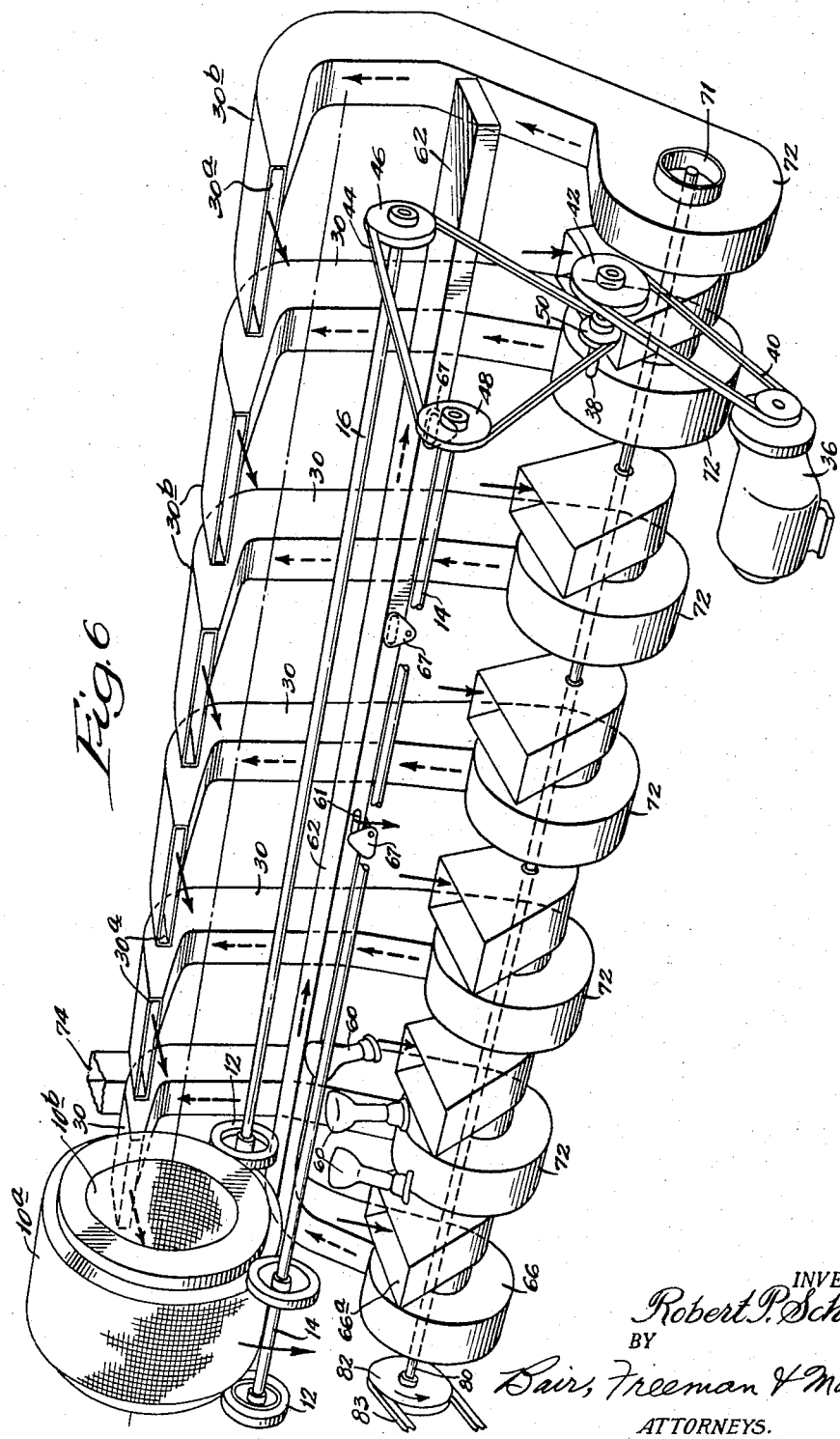
INVENTOR:
Robert P. Scherer,
BY
Bair, Freeman & Molinare
ATTORNEYS.

United States Patent Office 2,877,563
Patented Mar. 17, 1959

2,877,563

APPARATUS FOR DRYING GELATIN CAPSULES

Robert Pauli Scherer, Grosse Pointe, Mich., assignor to R. P. Scherer Corporation, Detroit, Mich., a corporation of Michigan Original application April 18, 1955, Serial No. 501,971. Divided and this application November 29, 1957, Serial No. 702,495

5 Claims. (Cl. 34—57)

This invention relates to an apparatus for quickly dehydrating soft gelatin capsules.

The capsules to be dehydrated in accordance with this invention have a completely sealed gelatin shell and are used as containers for a wide variety of materials, for example, pharmaceuticals, like vitamins. The active material is generally prepared as a solution or dispersion in liquid form, which liquid is enclosed in a shell made from a hot plastic flowable composition of plasticized gelatin, in accordance with well known practice. The gelatin shell of a freshly-prepared capsule will contain a substantial quantity of water, say 35 to 40%.

Freshly-prepared capsules are very weak mechanically and difficult to handle for packaging, shipping or storing until their strength has been increased by evaporating some of the water from the gelatin shell composition. Before evaporation of the moisture, the capsule exhibit plastic and adhesive characteristics, tending to cause them to deform and to mass together in groups of bunches. Furthermore, excess water in the shell may accelerate reaction with the capsule content. It is important, therefore, that the capsules be dehydrated immediately after preparation. Drying is commonly performed by immersing the capsule in acetone to extract the water, but the extraction must be carried out after the capsules have cooled for about one-half hour. Otherwise, the surface of the shell becomes checked and dulled due to the differential rate of water extraction between the outer and inner surfaces of the shell. During this cooling period deformation and massing is difficult to avoid. Dehydration has also been carried out completely in a tunnel drier. Since the temperature of the drying air in a tunnel drier must be maintained at below 82° F. to prevent softening and deformation of the gelatin shell, the drying time is far too long to be economical.

One object of the present invention is to provide an apparatus for quickly drying the gelatin shell of capsules in which the contents of the capsules are heated by radiant energy while the surface of the shell is being air-cooled to maintain the temperature thereof below the softening point of the gelatin.

Another object is to provide an apparatus for drying a large batch of freshly-prepared capsules without massing or distortion by simultaneously and continuously agitating the mass to keep the capsules separated, exposing the capsules to infra-red light rays and passing air through the capsules to cool the gelatin shell.

Another object is to provide an apparatus which is peculiarly adapted for continuously drying gelatin capsules, in accordance with the process of the present invention.

Another object is to provide an apparatus in which the soft, tacky capsules may be constantly agitated to prevent massing together, said apparatus comprising a foraminous supporting surface which keeps the capsules in motion, infra-red lamps for heating, and means for circulating cooling air past the moving capsules.

Another object is to provide an apparatus comprising a series of rotating drums for agitating the capsules, and which utilizes a stream of air for conveying the capsules from one drum to the next.

Other and further features and objects of this invention will become apparent from the following description as illustrated by the accompanying drawings, in which:

Figure 4 is a fragmentary sectional view taken along the line 4—4 of Figure 3 showing particularly the construction and mounting of one tumbling drum;

Figure 5 is a perspective view of the arcuate door assembly mounted between the drum compartments; and Figure 6 is a perspective view of the ductwork of the apparatus showing the direction of air flow therethrough.

Figure 1:
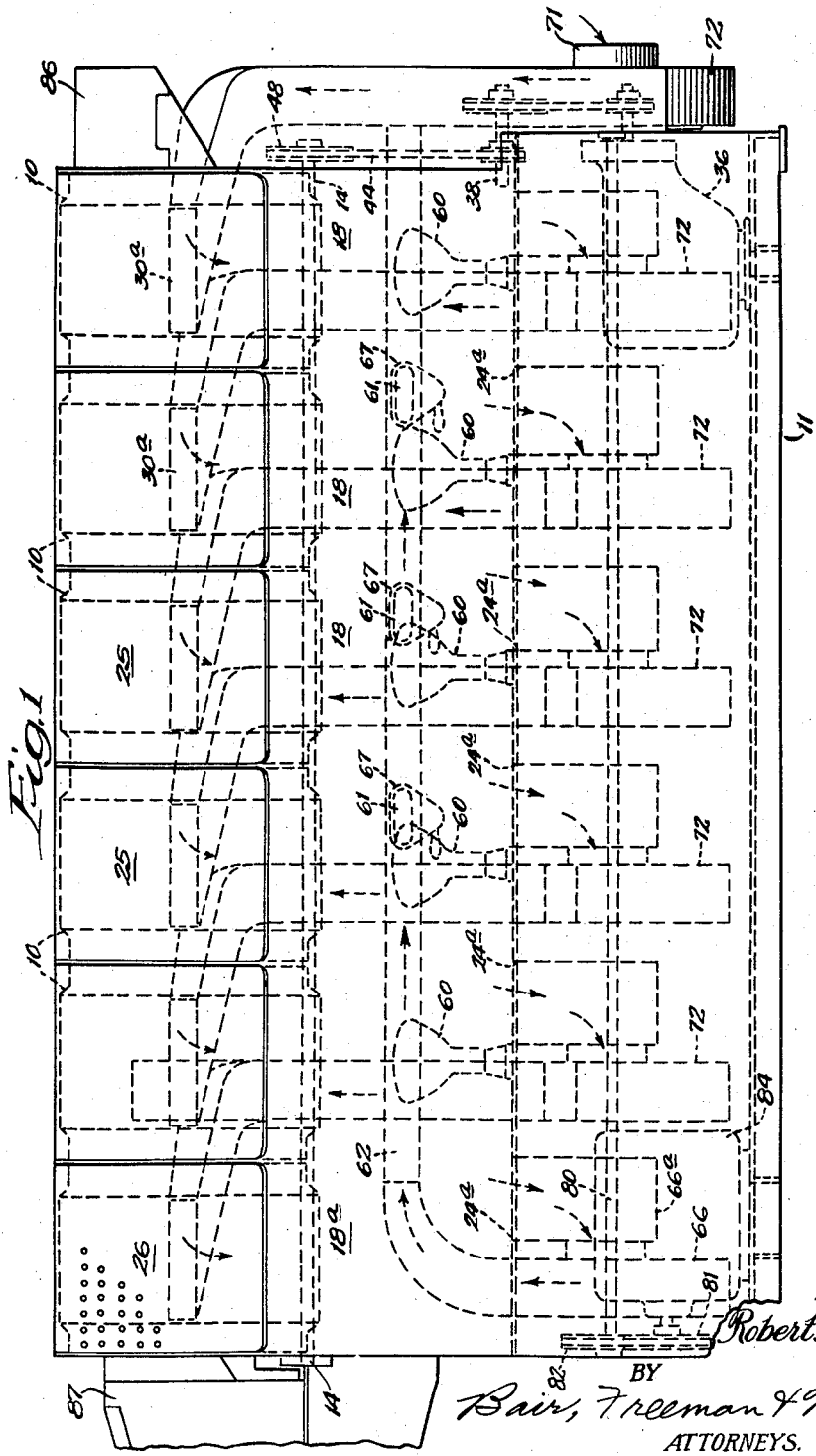
Figure 1 is a front elevational view of the apparatus employed for carrying out the invention.
Figure 2:
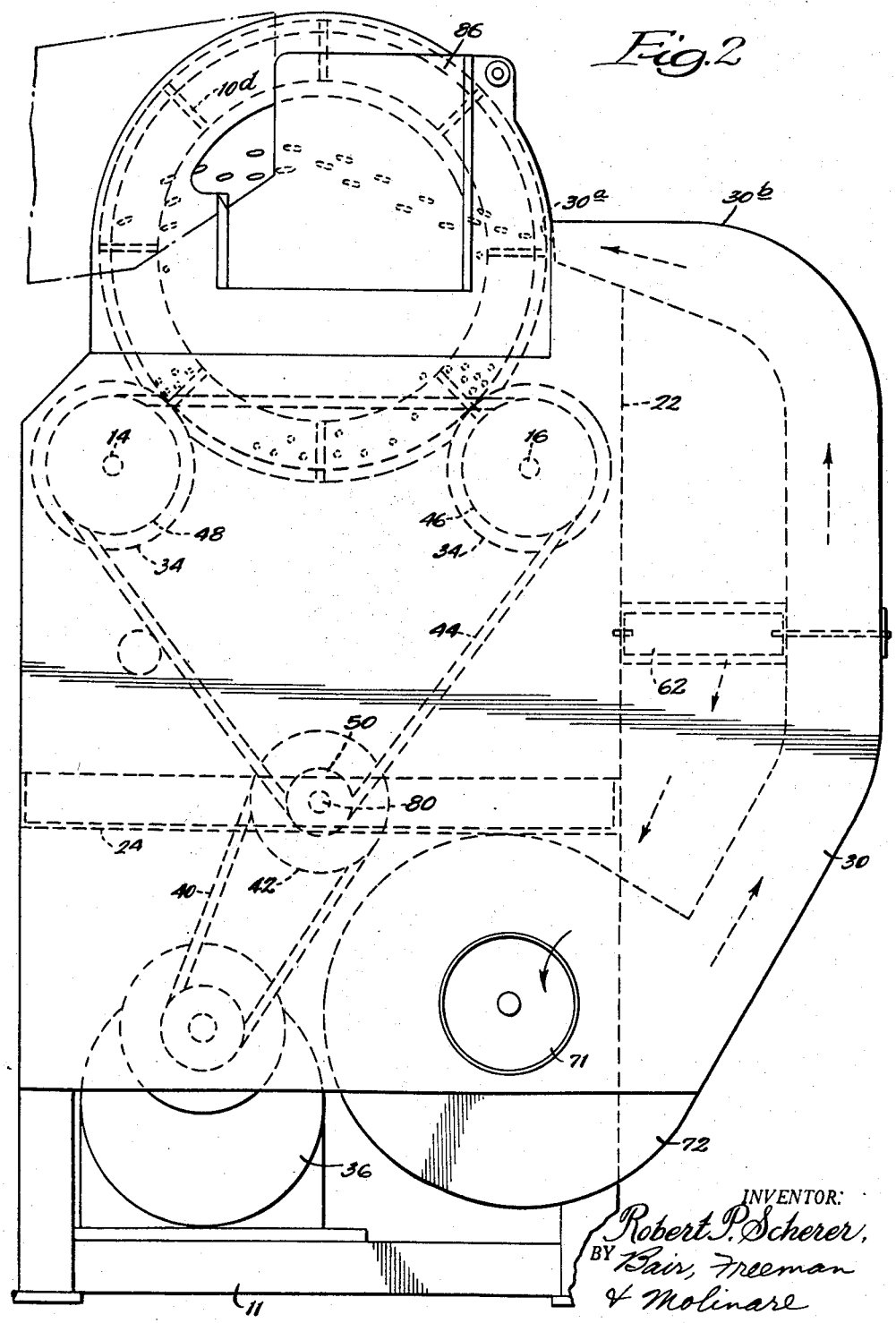
Figure 2 is an end elevation of the apparatus as viewed from the right end of Figure 1.

Briefly, the apparatus comprises a series or line of tumbling drums 10 rotatably mounted, with their axes in alignment, on rollers 34 fixed to spaced, parallel driven shafts 14 and 16 extending lengthwise of the machine, as best shown in Figure 6. The circumferential face 10a of each of the drums is made of a porous material so that air will pass freely therethrough. The ends 10b of the drums are open. Each drum 10 is enclosed in a separate compartment 18 (see Figure 1) communicating with its neighbor through an arcuate door 20 which is fixed to a rotatable shaft 21. Conditioned air is forced into each compartment through a duct 30 joining the compartment through the rear panel behind the drum. Infra-red lamps 60 mounted below each drum, except the final cooling drum in compartment 18a, supply the heat required for drying the capsules. Capsules to be dried are fed into the first drum, that is, the drum at the right-hand end of the apparatus, as shown in Figure 1. After a predetermined drying period the capsules are transferred into the adjacent drum on the left merely by opening the door 20. The capsules are being constantly tumbled in a rotary path as the drum rotates and as they are lifted to a point opposite the air inlet duct 30 they become entrained in the stream of air flowing into the drum. The air stream is directed toward the door 20 because of the angle at which the duct 30 joins the drum compartment, and when the door is open, carries the capsules through to the next drum. This transfer is repeated intermittently, advancing the capsules from one drum to the next in predetermined sequence, until the dried capsules finally are discharged from the last drum in the compartment 18a. Here the capsules are cooled before being subjected to further handling.

Figure 3:
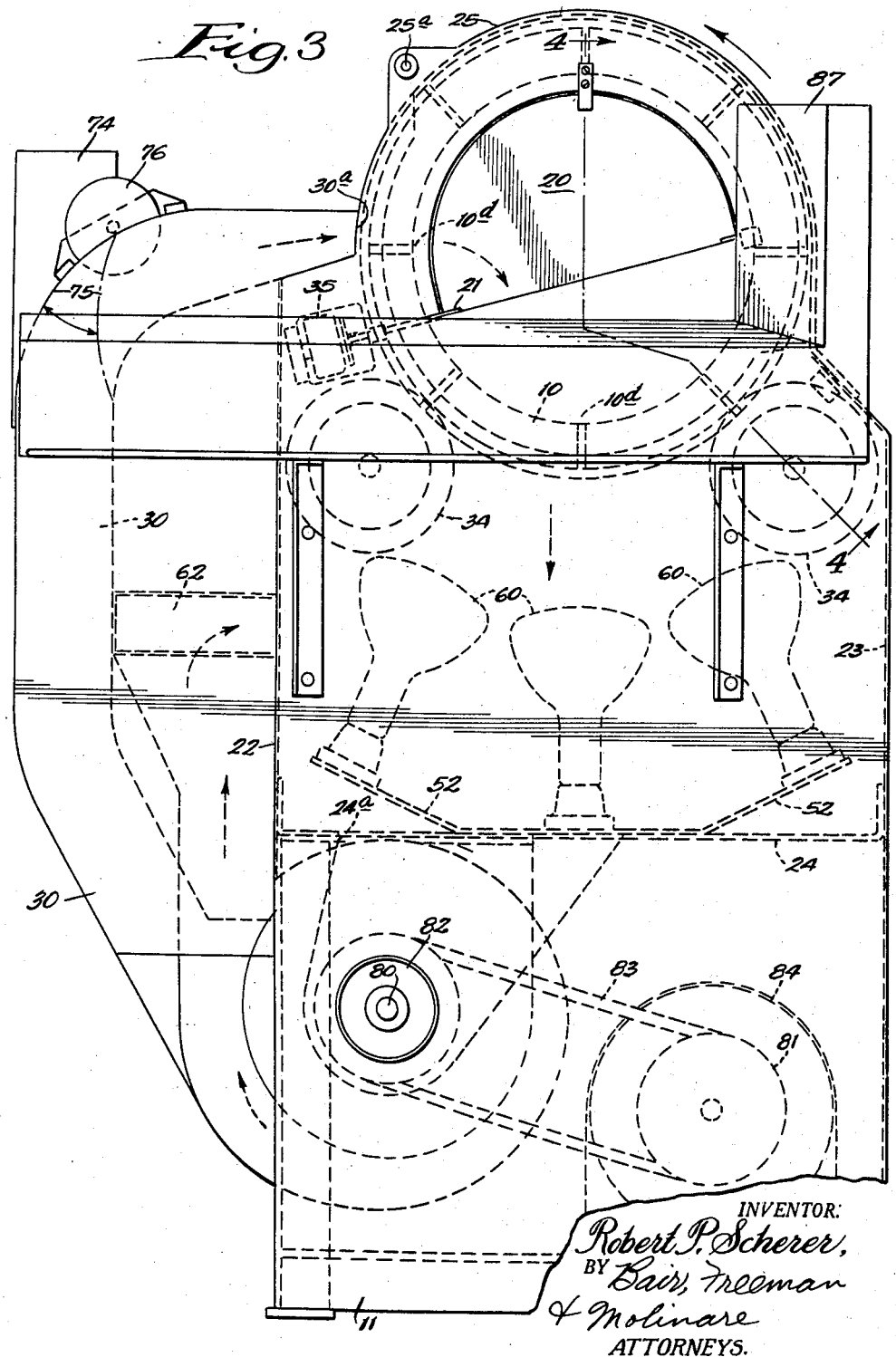
Figure 3 is an end elevation of the apparatus as viewed from the left end of Figure 1.

Referring now to the structural details, the supporting shafts for the drums 10 and the panels which define the compartments 18 are mounted on suitable frame, indicated generally by the numeral 11. In the apparatus illustrated, six compartments are employed, but it will be understood that any convenient number may be used. As best shown in Figure 3, each compartment is enclosed by a rear panel 22, front panel 23, bottom panel 24, and a curved, imperforate cover 25, which swings from hinges 25a and joins the panels 22 and 23 to completely enclose the top portion of the drum 10. The compartment 18a at the left end of the machine has a perforated cover 26 which permits air to flow from the room into said compartment so that the capsules are cooled before discharge from the apparatus, as explained hereinbelow. In other respects the covers 25 and 26 are identical. Preferably, the panels 22, 23 and 24 each comprise one piece which extends the entire length of the machine. Bulkheads or panels 28 separate the compartments 18 laterally, and each contains an opening 28a (Figure 4) approximately semi-circular in shape, and aligned with the openings 10b in the ends of the drums 10. The openings 28a are those through which the capsules pass in being transferred from one drum to the next. Each opening 28a is closed with a separator plate or transfer door 20 (see Figure 5) fixed to a shaft 21 rotatably mounted in brackets 31 secured to the bulkhead 28. The shaft 21 is coupled at one end to a conventional rotary solenoid 35 connected to a source of electrical power through a timer (not shown). At periodic intervals determined by the timer, the solenoid is activated and serves to rotate the shaft 21 to open the door to the position shown in dot and dash lines in Figure 4. Preferably, the door, when open, should form an angle with the bulkhead smaller than 90°. By restricting the angle of opening in this manner, capsules that might fall from the stream of air before they are carried into the next drum will slide down the door into the next drum, in the direction of the arrows in Figure 4.

The construction of the drums is best shown in Figure 4. Each of the drums is identical in construction and is mounted on four plastic-covered rollers or wheels 34, two fixed to the front shaft 14 and two fixed to the rear shaft 16. The drum has a foraminous circumferential face 10a made from screen wire or the like and circular openings 10b in both ends. For lifting the capsules, ribs 10d, equally spaced about the circumference, are secured to the inside diameter of the drum. The inside corners 10c are bevelled, as indicated in the drawing, to concentrate the capsules on the foraminous surface 10a so that they will be subject to direct radiation from the infra-red lamps 60 mounted below the drum. Suitable circumferential angular supports 10e are secured externally to the bevelled corners 10c of the drum for running contact with the plastic treads of the rollers 34. Shafts 14 and 16 carry the rollers, and are rotatably mounted in bearings (not shown) fixed to the frame of the machine. Both shafts are driven by a motor 36 which drives the shaft 38 through a belt and pulley arrangement 40, 42. A second belt 44 is trained over a pulley 50 fixed to the shaft 38, and over pulleys 46 and 48 fixed to shafts 16 and 14, respectively.

To supply heat for drying the capsules, several infra-red lamps 60, connected to a source of power (not shown) are mounted on a base 52 supported by the panel 24 within each compartment 18, as best shown in Figure 3. The lamps are arranged so that the rays impinge directly on the foraminous face 10a of the drum. In the drawing, three lamps are shown in each compartment, but more or less may be used as determined by the size of the compartments and the wattage of the lamps. The lamps are of the variety that emit light waves having a wave length of from 9,000 to 15,000 angstrom units. For maximum efficiency in drying it is important that the wave length be within this range.

A system of ducts and blowers for moving conditioned air through the compartments is best shown in Figures 1 and 6. The main air inlet to the compartments is through intake opening 71 of the blower 72 located at the right end of the machine. The discharge side of the blower 72 connects to a riser duct 30 which skirts the duct 62 and returns as a horizontal portion 30b which connects to the back of the panel 22 through an opening 30a. It will be noted from Figure 1 that the upper horizontal portion 30b of the duct 30 joins the opening in the rear panel 22 at an acute angle so that the air discharged from the duct is directed toward the opening in the left or far end of the drum, as viewed in Figures 1 and 6. By directing the air stream in this manner, the air may be utilized not only for removing moisture from the capsules, but also for wafting the capsules from one drum to the next when the door 20 is open. Air introduced through the opening 30a flows through the capsules which are being tumbled and heated simultaneously within the drum 10, out through the foraminous face 10a, through the opening 24a in the bottom panel 24 of the compartment adjacent the infra-red lamps, and into the intake side of the next blower 72. The discharge side of the blower 72 connects to the next duct 30 for introducing air, which has now been raised in temperature to some extent by passage through the first compartment, into the next compartment 18. Each compartment 18 has an identical blower 72 which sucks the air therefrom and forces it into the compartment to the left. The penultimate blower in the line discharges moisture-laden air into a stack 74 which is a vertical extension of the duct 30. A damper 75 (Figure 3), operated by rotary solenoid 76, is provided in the duct 30 so that the air may be blocked off from the discharge duct 74 and permitted to flow into the compartment 18a, through opening 30a, when it is desired to transfer the capsules in this last compartment from the machine. Normally, the damper 75 will be closed so that the air coming up through the duct 30 will be discharged into the exhaust duct 74. The solenoid 76 is in the same circuit as the solenoid 35 operating the door 20 of compartment 18a so that the air stream begins to convey the capsules from the drum as soon as the door opens.

A duct 62, running lengthwise of the machine behind the compartments 18, serves to convey supplementary conditioned air drawn from the room, or other suitable source, to the central compartments 18. The quantity of air introduced is sufficient to maintain constant volume in each of the compartments. Duct 62 connects to the discharge side of blower 66 at the left end of the machine, which draws relatively cool air from the room through the last or cooling compartment 18a via intake 66a which connects to openings 24a (Figure 3) in the panel 24. The cover 26 enclosing compartment 18a is foraminous for this purpose. The conditioned air is blown through duct 62 toward the opposite end of the machine. Dampers 67 are provided over openings 61 interconnecting the duct 62 with the compartments 18 through rear panel 22 to admit the desired volume of air to the compartments.

The blowers 72 and 66 are driven from a common shaft 80, which connects to a motor 84 as shown in Figure 3, by means of pulleys 81 and 82 fixed to the motor shaft and the shaft 80, respectively. V-belt 83 is trained about the pulleys 81 and 82.

A hopper 86 is provided at the right end of the machine for charging capsules into the first drum, and suitable funneling means 87 is mounted on the left end of the machine to direct the capsules discharged from the last drum into containers for subsequent handling.

In operation, capsules to be dried are charged into the hopper 86 at the right end of the apparatus, as shown in Figure 1, from which they are fed directly into the first drum 10 in compartment 18. The motion imparted to the capsules must have both vertical and horizontal components so that the capsules are moved in a circulatory path. Rotating drums have been found to be the preferable means for imparting this motion. The oily film which usually covers the exterior of the capsule must be removed. The film results from application of oil to the gelatin ribbons from which the capsules are formed. The speed at which the drum rotates is important in preventing the capsules from massing or adhering together. For drums about sixteen inches in diameter, we have found that 60 R. P. M. is a suitable speed. If the speed is increased much beyond this point the capsules will be held in contact with the circumference of the drum by centrifugal force instead of being lifted by the ribs 10d to the peak of the circulatory path and then dropped. If masses of capsules are permitted to remain in contact with each other for any prolonged period of time within the range of the infra-red lamps, fusion will result. If the speed is reduced substantially below 60 R. P. M., the capsules lack the momentum required to lift them to the top of the circular path through which they are intended to flow. It is essential that the capsules be lifted at least to the level of air opening 30a so that they are subjected to the full flow of air passing through the drum. The rotating drum has been found to be very effective in keeping all the capsules constantly in motion, thus greatly minimizing any tendency to fuse together.

The first drum at the right end of the machine serves as a receiver for freshly-prepared capsules. The capsules are charged into the drum for a predetermined period of time, depending upon the size of the capsules and the rate of manufacture. The door 20, activated by the solenoid 35, is then opened to permit the capsules to be transferred to the second drum. The air stream flows directly from opening 30a through the door of the compartment, catches the capsules as they are lifted to the height of the air inlet, and wafts them into the next drum. After the machine has been in operation for some time and all the drums are filled, the transfer at the end of the predetermined period (15 to 30 minutes) begins with discharge of partially dehydrated capsules from the cooling drum in compartment 18a. The door to the receiving means 87 is then closed, and the door between the penultimate drum and the cooling drum is opened to transfer the capsules to the latter. In this way the capsules are successively advanced. The capsules may be fed intermittently, as well as continuously, into the first drum from hopper 86. When the capsules are being charged into the apparatus continuously, the cycle is sufficiently long so that even the fresh capsules transferred immediately after entering the first drum are satisfactorily dried upon discharge at the opposite end of the machine.

An important feature of this apparatus is that by utilizing the air which is discharged from the adjacent compartment, the temperature thereof progressively increases until maximum temperature (about 95° F.) is attained in the penultimate compartment 18, which is the compartment adjacent cooling compartment 18a. The capsules are much better able to stand elevated temperatures after being partially dried and, consequently, the progressive elevation in air temperature results in a relatively rapid drying cycle without danger of adhesion.

When a batch of capsules is finally discharged into the last drum 10 in compartment 18a, they are cooled by air at 70° and a relative humidity of less than 45% which is drawn from the room through the perforated cover 25 enclosing the last compartment. The temperature of the capsules should not be greater than 85° F. after cooling. As indicated, the cooling air flows out of the compartment 18a into the duct 66a and is forced by the blower 66 into the duct 62 for preheating. If the room is not air conditioned, air may be supplied at proper temperature and relative humidity through suitable conduits (not shown) connecting to the compartment 18a. Air supplied to conduit 61 is normally drawn from the room, but may be connected to the same source if the room air is not properly conditioned.

It has been noted in operating the device described that irradiation by infra-red rays will raise the temperature of the contents of the capsules to 135 to 145° F. The gelatin shell has a softening point of about 120° F. Consequently, it is necessary to flow air constantly through the mass of capsules to keep the gelatin surface of the shell cool and at the same time sweep out moisture that has been evaporated. It appears that the capsule walls themselves do not absorb the infra-red rays and are not heated directly by the rays, although the capsule walls will receive heat from the contents of the capsules by conduction. I have found that if the wave length is greater than 15,000 angstroms, the ambient temperature surrounding the capsules is excessively high and results in the formation of a skin on the surface of the capsules which interferes with evaporation of the water therefrom. If the wave length is shorter than 9,000 angstroms, the energy is dissipated through visible light which does not penetrate the shell. This also causes the outside of the shell to dry first and "case harden" the capsule.

It is possible that the critical nature of the wave length range may be due to selective absorption by the contents of the capsules. This is borne out by the fact that the capsule wall will soften even when the wave length is within the range specified if the oily film on the surface has not been removed. The oil appears to absorb infra-red radiation. It is important, therefore, that the capsules be pretreated with naphtha or acetone or other solvent which is capable of removing the oily film from the surface.

As indicated, irradiation alone, or irradiation in conjunction with agitation, will destroy the capsules unless air is flowing through the mass. The air should be maintained at a temperature not in excess of 100° F. and should preferably range from 85 to 95° F. In the apparatus described, air entering the first drum is approximately 85° F. and after passing through the intervening compartments, enters the last drying drum at about 95° F. Temperatures as low as 70° F. may be used, but, of course, this will slow down the rate at which the moisture is evaporated. The relative humidity of the air should not exceed 45% and preferably is within the range of 30–40%. Below 30% there is a tendency to "case harden" the shell. The rate of air flow through the drum should be such as to displace continuously all the water vapor generated as the capsules are dried.

In the drying method of the invention, the capsule contents are heated while the capsule walls are maintained in a relatively cool condition. Thus, the heat for water vaporization is conducted radially outwardly from the capsule contents through the capsule walls to dry them without formation of skin on the outside surface of the capsule wall. For this reason the capsules are dried rapidly, efficiently and uniformly. Dehydration in this manner is continued until from 60–70%, preferably 63–68%, of the original moisture content of the capsules has been removed. This amount of moisture will be removed in about two hours in accordance with the invention. The capsules may then be handled without fear of distortion and any further dehydration may be conveniently carried out in a tunnel drier. The final drying may be conducted in the present apparatus, but removal of additional moisture is preferably done in a tunnel drier since agitation and air flow is no longer critical. The finished capsules ordinarily contain about 12 to 15% moisture. To reach this level about 12 to 16 hours is required in the tunnel drier.

A number of important advantages are obtained by drying capsules in accordance with the present invention:

(1) Capsules with thin walls maintain their molded original shape. When dried on a supporting surface in accordance with conventional practice, such capsules will "squat" or become flat on the bottom.

(2) The welded seam joining the two capsule half shells, and formed during manufacture, is much stronger by reason of heating the interior surface. This causes the abutting surfaces of the half shells to flow together to provide an integral bond.

(3) Because the drying time is greatly reduced, very little of the liquid contents within the gelatin shell, particularly water soluble material, escapes to the atmosphere during drying.

(4) Continued agitation during drying tends to bring distorted capsules back to their true shape.

What I claim as new and desire to secure by Letters Patent of the United States is:

1. In an apparatus for drying soft gelatin capsules, a plurality of aligned compartments including first, last and intermediate compartments laterally divided from each other by bulkheads, each containing a door, each compartment having an air inlet opening and an air outlet opening, said last compartment having a second air inlet opening, a rotatable drum mounted in each compartment, said drum having a foraminous circumferential wall and open ends, the ends of adjacent drums facing the door in the bulkhead therebetween, a first blower having its intake side communicating with a source of conditioned air and its discharge side communicating with the air inlet of said first compartment, a last blower having its intake side connected to the outlet opening of said last compartment, a blower associated with each intermediate compartment having its intake side connected to the air outlet of said intermediate compartment and its discharge side connected to the air inlet of an adjacent compartment, means for directing the air stream entering each compartment through the air inlet so as to waft capsules from the drum to the drum in an adjacent compartment through the open ends thereof upon opening said door, and infra-red lamps mounted in said first and intermediate compartments adjacent the drums therein for heating said capsules.

2. In an apparatus for drying soft gelatin capsules, a plurality of aligned compartments including first, last and intermediate compartments laterally divided from each other by bulkheads, each containing a door, each compartment having an air inlet opening and an air outlet opening, said last compartment having a perforated cover for admitting air from the room, a rotatable drum mounted in each compartment, said drum having a foraminous circumferential wall and open ends, the ends of adjacent drums facing the door in the bulkhead therebetween, a first blower having its intake side communicating with a source of conditioned air and its discharge side communicating with the air inlet of said first compartment, a last blower having its intake side connected to the outlet opening of said last compartment for drawing air through said perforated cover to cool capsules in the drum in said compartment, a blower associated with each intermediate compartment having its intake side connected to the air outlet of said intermediate compartment and its discharge side connected to the air inlet of an adjacent compartment, means for directing the air stream entering each compartment through the air inlet so as to waft capsules from the drum to the drum in an adjacent compartment through the open ends thereof upon opening said door, and infra-red lamps mounted in said first and intermediate compartments adjacent the drums therein for heating said capsules.

3. In an apparatus for drying soft gelatin capsules, a plurality of aligned compartments including first, last and intermediate compartments laterally divided from each other by bulkheads, each containing a door, each compartment having an air inlet opening and an air outlet opening, said last compartment having a perforated cover for admitting air from the room, a rotatable drum mounted in each compartment, said drum having a foraminous circumferential wall and open ends, the ends of adjacent drums facing the door in the bulkhead therebetween, a first blower having its intake side communicating with a source of conditioned air and its discharge side communicating with the air inlet of said first compartment, a last blower having its intake side connected to the outlet opening of said last compartment for drawing air through said perforated cover to cool capsules in the drum in said compartment, the discharge side of said last blower connecting to a duct having outlet ports to each intermediate compartment, a blower associated with each intermediate compartment having its intake side connected to the air outlet of said intermediate compartment and its discharge side connected to the air inlet of an adjacent compartment, means for directing the air stream entering each compartment through the air inlet so as to waft capsules from the drum to a drum in an adjacent compartment through the open ends thereof upon opening said door, and infra-red lamps mounted in said first and intermediate compartments adjacent the drums therein for heating said capsules.

4. In an apparatus for drying soft gelatin capsules, a plurality of aligned compartments including first, last and intermediate compartments laterally divided from each other by bulkheads, each containing a door, each compartment having an air inlet opening and an air outlet opening, said last compartment having a perforated cover for admitting air from the room, a rotatable drum mounted in each compartment, said drum having a foraminous circumferential wall and open ends, the ends of adjacent drums facing the door in the bulkhead therebetween, a first blower having its intake side communicating with a source of conditioned air and its discharge side communicating with the air inlet of said first compartment, a last blower having its intake side connected to the outlet opening of said last compartment for drawing air through said perforated cover to cool capsules in the drum in said compartment, the discharge side of said last blower connecting to a duct having outlet ports to each intermediate compartment, a blower associated with each intermediate compartment having its intake side connected to the air outlet of said intermediate compartment and its discharge side connected to the air inlet of an adjacent compartment, means for directing the air stream entering each compartment through the air inlet so as to waft capsules from the drum to a drum in an adjacent compartment through the open ends thereof upon opening said door, controlled means for opening said doors in timed relation to permit advancing said capsules from one drum to the next, and infra-red lamps mounted in said first and intermediate compartments adjacent the drums therein for heating said capsules.

5. In an apparatus for drying soft gelatin capsules, a plurality of aligned compartments including first, last, penultimate, and intermediate compartments laterally divided from each other by bulkheads, each containing a door, each compartment having an air inlet opening and an air outlet opening, said last compartment having a perforated cover for admitting air from the room, a rotatable drum mounted in each compartment, said drum having a foraminous circumferential wall and open ends, the ends of adjacent drums facing the door in the bulkhead therebetween, a first blower having its intake side communicating with a source of conditioned air and its discharge side communicating with the air inlet of said first compartment, a last blower having its intake side connected to the outlet opening of said last compartment, a blower associated with each intermediate compartment having its intake side connected to the air outlet of said intermediate compartment and its discharge side connected to the air inlet of an adjacent compartment, a penultimate blower having its intake side connected to the air outlet of said penultimate compartment and its discharge side connected to a forked duct, one branch of said forked duct connecting to the air inlet of said last compartment, the other branch of said forked duct connecting to an exhaust duct, a damper in said forked duct normally permitting air discharged from said penultimate compartment to flow into the exhaust duct, controlled means for closing said damper when it is desired to cause said air to flow through the air inlet of said last compartment to remove capsules from the drum therein, means for directing the air stream entering each compartment through the air inlet so as to waft capsules from the drum to the drum in an adjacent compartment through the open ends thereof upon opening said door, and infra-red lamps mounted in said first, penultimate, and intermediate compartments adjacent the drums therein for heating said capsules.

References Cited in the file of this patent
UNITED STATES PATENTS

| | | |
|---|---|---|
| 1,102,662 | Hobbs | July 7, 1914 |
| 2,406,494 | Ferris | Aug. 27, 1946 |